United States Patent [19]

Dichter

[11] Patent Number: 4,526,270

[45] Date of Patent: Jul. 2, 1985

[54] APPLIANCE FOR FEEDING GLASS TUBES TO GLASS-PROCESSING MACHINES

[76] Inventor: Hans-Joachim Dichter, Sachsendamm 93, D-1000 Berlin 62, Fed. Rep. of Germany

[21] Appl. No.: 477,220

[22] Filed: Mar. 21, 1983

[30] Foreign Application Priority Data

Mar. 30, 1982 [DE] Fed. Rep. of Germany ....... 3212228

[51] Int. Cl.³ .............................................. B65G 47/12
[52] U.S. Cl. .................................... 198/453; 198/479; 198/576; 414/24; 414/910; 65/280
[58] Field of Search ............... 198/443, 453, 454, 479, 198/481, 450, 449, 448, 653, 654, 694, 695, 696, 575, 576, 582, 611, 612, 480, 482; 414/745, 748, 22, 24, 910; 221/218, 219, 225, 231, 266; 65/270, 280

[56] References Cited

U.S. PATENT DOCUMENTS

| | | | |
|---|---|---|---|
| 1,854,943 | 4/1932 | Kunath | 221/219 |
| 2,804,737 | 9/1957 | Rogier et al. | 198/443 X |
| 3,128,817 | 4/1964 | Shaver | 198/479 X |
| 3,330,400 | 7/1967 | Alexander | 198/479 |
| 3,480,129 | 11/1969 | Tatibana | 198/480 X |
| 3,612,255 | 10/1971 | Tassie et al. | 198/450 |
| 4,230,219 | 10/1980 | Pezzin et al. | 198/481 |
| 4,446,960 | 5/1984 | Zauner et al. | 198/408 |

Primary Examiner—Joseph E. Valenza
Assistant Examiner—Jonathan D. Holmes
Attorney, Agent, or Firm—Parmelee, Bollinger & Bramblett

[57] ABSTRACT

For the purpose of feeding glass tubes (2) to a glass-processing machine, use is made of an appliance which essentially comprises a glass-tube magazine (1), a separating unit (17), and an endless conveyor (25), the latter being fitted with feeding tongs (23). Individual glass tubes (2) are supplied to the feeding tongs (23) by the separating unit (17). The glass-tube magazine (1) can be loaded with a bundle of glass tubes.

14 Claims, 2 Drawing Figures

APPLIANCE FOR FEEDING GLASS TUBES TO GLASS-PROCESSING MACHINES

BACKGROUND OF THE INVENTION

The invention relates to an appliance for feeding glass tubes to glass-processing machines, from a glass-tube magazine which receives a bundle of glass tubes, which possesses an exit opening and to which a unit for separating the glass tubes is assigned.

An appliance of the abovementioned type is known, in which individual glass tubes from a glass-tube magazine can, as required, enter the region of a hopper which feeds the clamping jaws of a glass-processing machine, the tubes passing through a pivotable feeding and shut-off element (German Auslegeschrift No. 2,719,390). The known appliance is incapable of performing in an entirely satisfactory manner, insofar as, in this appliance, the glass tubes can be transferred into the feeding hopper virtually only when this hopper is stationary, that is to say when the glass-processing machine is operating in a stepwise manner.

The object underlying the invention is to provide an appliance of the type under consideration, which appliance can, with the aid of mechanical means, be fed with bundles of glass tubes, and which automatically transfers individual glass tubes, as required, from the bundle of glass tubes and into the clamping devices of a glass-processing machine which operates uninterruptedly, or into glass-tube magazines which are located in advance of these clamping devices.

SUMMARY OF THE INVENTION

This object is achieved, according to the invention, by means of an appliance of the type under consideration, in which appliance the separating unit serves to transfer individual glass tubes from the glass-tube magazine into the gripping zone of feeding tongs which are mounted on an endless conveyor serving the function of feeding the glass tubes to the glass-processing machine.

The appliance according to the invention offers the advantage that it can be fed, by mechanical means, with a large number of glass tubes at any given time and that it is possible, as a result of using an endless conveyor, to transfer the glass tubes from the glass-tube magazine and into the glass-processing machine along a comparatively large travel of the individual processing stations of the glass-processing machine. In consequence, the glass-processing machine does not need to be brought to a standstill for the purpose of loading with new glass tubes but can operate uninterruptedly.

BRIEF DESCRIPTION OF THE DRAWINGS

Further details and features of the invention are evident from the sub-claims, and from the description, in the text which follows, of a preferred illustrative embodiment which is represented in the attached drawing, in which:

DESCRIPTION OF THE PREFERRED EMBODIMENT

Figure 2:
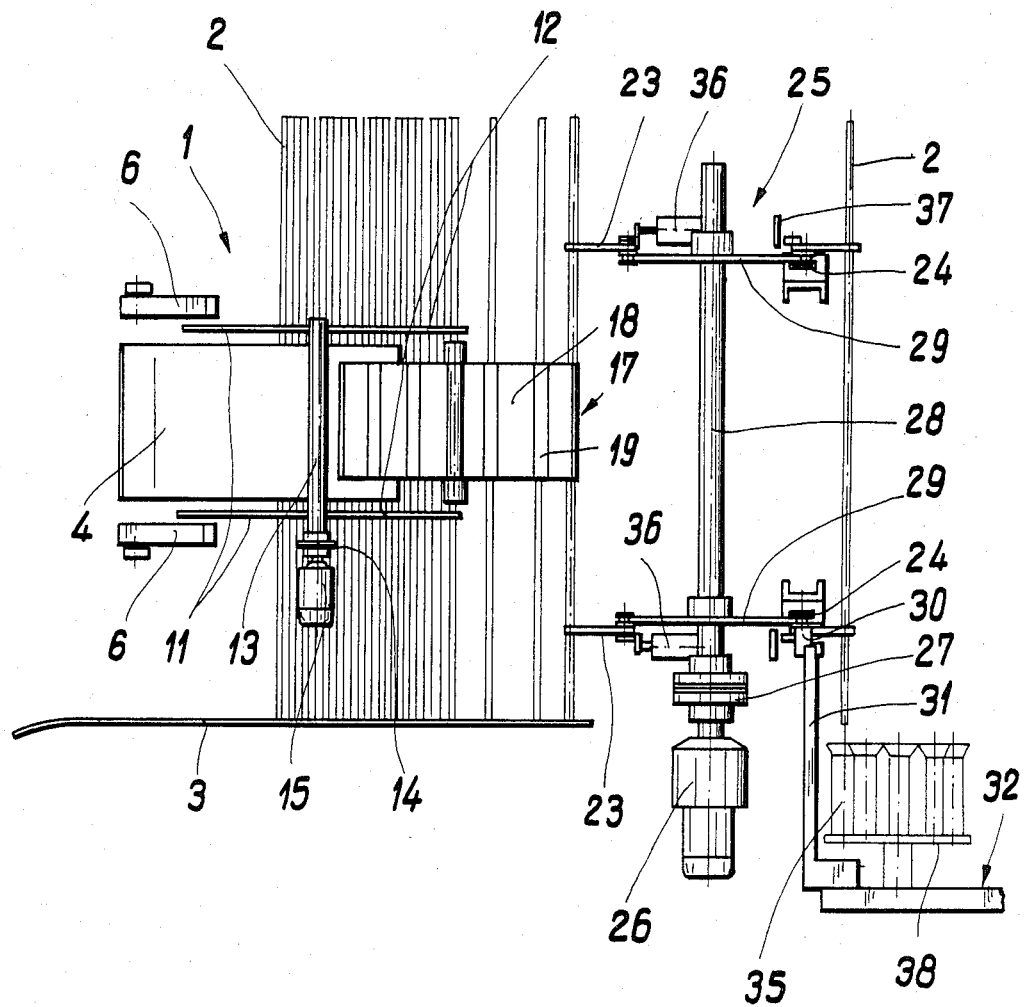
FIG. 2 shows a side view of the essential parts of the feeding appliance according to FIG. 1.

In the Figures, a glass-tube magazine is marked 1, in its entirety, into which bundles of glass tubes 2 can be introduced. The glass-tube magazine possesses a bottom 3, on which the ends of the glass tubes 2 rest, together with guides 4 and 5, which form means for holding the glass tubes 2 vertically oriented with respect to the bottom (3) of the magazine as shown in FIG. 2. A loading member is marked 6, which can be operated by means of a piston 7 and which possesses a control roller 8 which can be moved along a crank member 9. Different positions of the loading member 6 are indicated by broken lines. The glass tubes, introduced into the glass-tube magazine 1 through the entry opening 10, are moved, by the loading member 6, into the region of the forward-feed forks 11 and 12. In this arrangement, the prongs of the forward-feed forks 11 and 12 are formed by cantilever arms on a shaft 13, these prongs being arranged in pairs. This shaft is driven by a drive motor 15 via a slipping clutch 14. Dut to the fact that a slipping clutch 14 is used, the forks 11 or, as the case may be, 12 respectively exert a light pressure on the bundle of glass tubes 2 which is placed in front of them, and the glass tubes 2 are consequently pressed towards an exit opening 16 of the glass tube magazine 1. A separating unit 17 is located after the exit opening 16. This separating unit 17 is formed by a cellular wheel 18 which is provided, at its periphery, with a large number of cells 19, these cells being open towards the outside so that each can receive one glass tube 2. A pressure-belt 20 extends over a portion of the periphery of the cellular wheel 18, this belt holding the glass tubes 2 in the cells 19, into which they have been transferred from the exit opening 16 of the glass-tube magazine. The pressure-belt passes over two reversing drums 21 and 22. Of these two reversing drums, the reversing drum 21 is located in the region of the exit opening 16 of the glass-tube magazine 1. This leads to the result that the glass tube 2 which, at any given time, comes to bear against the pressure-belt 20 is caused to rotate in the region of the exit opening 16, thus preventing the glass tubes from jamming in this region.

Figure 1:
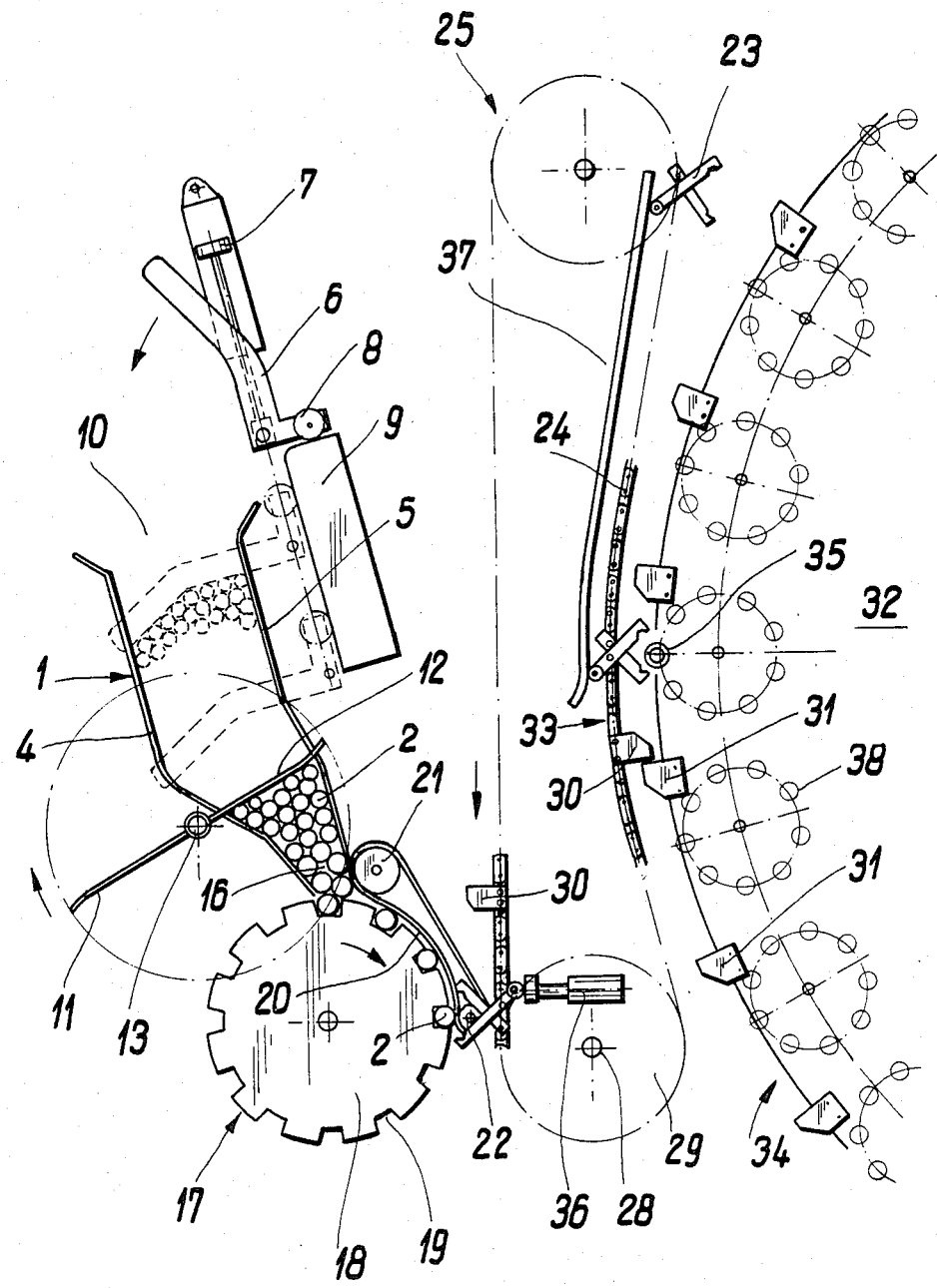
FIG. 1 shows a plan view of the essential parts of the feeding appliance.

The cellular wheel 18 and the pressure-belt 20 transfer individual glass tubes 2 into the gripping zone of feeding tongs 23, which are secured to the conveying chains 24 of an endless conveyor which in its entirety, is marked 25. A geared motor 26, the speed of which is infinitely adjustable, serves to drive the endless conveyor 25 and its conveying chains 24, this motor 26 driving the chainwheel shaft 28 of two drive-chainwheels 29 via an overrunning clutch 27. The overrunning clutch 27 is necessary because the endless conveyor 25 is fitted with stops 30 which are driven forward by driving-dogs 31 on the glass-processing machine 32. As can be recognised from FIG. 1, a portion 33 of the path of the conveying chains 24 of the endless conveyor 25 runs at a constant distance from the path 34 of the receptacles 35 for the glass tubes on the glass-processing machine 32.

Finally, 36 and 37 are actuating members for the purpose of opening and closing the feeding tongs 23. The actuating member 36 is formed by a feeding-tong opening device, which is operated by either electrical or pneumatic means, and the actuating member 37 is formed by a control rail.

It is self-evident that the initiation of a feeding operation is controlled in accordance with the extent to which the glass-tube magazines 38 in the glass-processing machine 32 are filled. In the present document, the description of an appropriate control system is deliberately omitted.

What is claimed is:

1. Appliance for feeding glass tubes to glass-processing machines, from a glass-tube magazine (1) which receives a bundle of glass tubes (2) and which possesses an exit opening (16) to which a unit (17) for separating the glass tubes (2) is assigned, wherein the separating unit (17) serves to transfer individual glass tubes from the glass-tube magazine (1) into the gripping zone of feeding tongs (23) which are mounted on an endless conveyor (25) serving the function of feeding the glass tubes to the glass-processing machine (32), said endless conveyor (25) possessing two conveying chains (24) which are arranged one above the other, and said endless conveyor being fitted with stops (30) engaged by driving dogs (31) on the glass-processing machine (32).

2. Appliance according to claim 1, wherein the two conveying chains (24) which are arranged one above the other carry the feeding tongs (23) which are likewise arranged one above the other.

3. Appliance according to claim 2, wherein a chain wheel shaft (28) with two drive-chain wheels (29) serves to drive the conveying chains (24), this shaft (28) being connected to a geared motor (26) via an over-running clutch (27).

4. Appliance according to claim 3, wherein a portion (33) of the path of the endless conveyor (25) forms an equidistant path with respect to the path (34) of the receptacles (35) for the glass tubes on the glass-processing machine (32).

5. Appliance according to claim 4, wherein actuating members (36,37) are assigned to the endless conveyor (25) for the purpose of opening and closing the feeding tongs (23).

6. Appliance according to claim 1, wherein the separating unit (17) transferring the glass-tubes into the gripping zone of the feeding tongs (23) is formed by a cellular wheel (18) which is provided, at its periphery, with a plurality of cells (19), these cells being open towards the outside so that each can receive one glass tube (2).

7. Appliance according to claim 6, wherein a pressure-belt (20) extends over a portion of the periphery of the cellular wheel (18), this belt (20) holding the glass tubes (20) in the cells (19), into which they have been transferred from the exit opening (16) of the glass tube magazine (1).

8. Appliance according to claim 7, wherein one (21) of a plurality of reversing drums (21,22) of the pressure-belt (20) projects into the region of the exit opening (16) of the glass tube magazine (1).

9. Appliance according to claim 1, wherein the glass tube magazine (1), which possesses a bottom (30) for supporting the ends of the glass tubes (2) and guides (4,5) for holding them vertically oriented with respect to the bottom (3), is provided with at least one forward-feed fork (11,12) which presses them between the guides (4,5).

10. Appliance according to claim 9, wherein the glass tube magazine (1) is provided with at least two forward-feed forks (11,12), the prongs of which are formed by cantilever arms on a shaft (13).

11. Appliance according to claim 10, wherein the shaft (13) carrying the cantilever arms is connected to a drive motor (15) via a slipping clutch (14).

12. Appliance for feeding glass tubes to glass-processing machines, from a glass tube magazine (1) which receives a bundle of glass tubes (2), possesses an exit opening (16) and to which a unit (17) for separating the glass tubes (2) is assigned, wherein the separating unit (17) serves to transfer individual glass tubes from the glass tube magazine (1) into the gripping zone of feeding tongs (23) which are mounted on an endless conveyor (25) serving the function of feeding the glass tubes to the glass-processing machine (32), said glass tube magazine (1) having a bottom (3) for supporting the ends of glass tubes (2) and guides (4,5) for holding said glass tubes vertically oriented with respect to said bottom (3), said glass tube magazine being provided with at least two forward-feed forks (11,12) which press said glass tubes between said guides, said forward-feed forks having prongs which are formed by cantilever arms on a shaft (13).

13. Appliance according to claim 12, in which said shaft (13) carrying said cantilever arms is connected to a drive motor (15) via a slipping clutch (14).

14. Appliance for feeding glass tubes to glass-processing machines, from a glass tube magazine (1) which receives a bundle of glass tubes (2), possesses an exit opening (16) and to which a unit (17) for separating the glass tubes (2) is assigned, wherein the separating unit (17) serves to transfer individual glass tubes from the glass tube magazine (1) into the gripping zone of feeding tongs (23) which are mounted on a conveyor (25) serving the function of feeding the glass tubes to the glass-processing machine (32), said conveyor being fitted with stops (30) engaged by driving dogs (31) on the glass-processing machine (32).

* * * * *